United States Patent [19]

Gowan et al.

[11] 4,387,962
[45] Jun. 14, 1983

[54] CORROSION RESISTANT LASER MIRROR HEAT EXCHANGER

[75] Inventors: John G. Gowan, London, England; Roy A. Hamil, Tijeras, N. Mex.

[73] Assignee: The United States of America as represented by the Secretary of the Air Force, Washington, D.C.

[21] Appl. No.: 308,976

[22] Filed: Oct. 6, 1981

[51] Int. Cl.³ .............................................. G02B 7/18
[52] U.S. Cl. ...................................... 350/310; 427/253
[58] Field of Search ................. 350/310, 288; 427/253

[56] References Cited

U.S. PATENT DOCUMENTS

| | | | |
|---|---|---|---|
| 3,178,308 | 4/1965 | Oxley et al. | 117/106 |
| 3,477,872 | 11/1969 | Amick | 117/212 |
| 3,565,676 | 4/1968 | Holzl | 117/107.2 |
| 3,697,343 | 10/1972 | Cuomo et al. | 156/13 |
| 3,911,194 | 10/1975 | Dejachy et al. | 428/408 |
| 4,082,865 | 4/1978 | Ban et al. | 427/253 |
| 4,110,013 | 8/1978 | Eitel | 350/310 |

Primary Examiner—Jon W. Henry
Attorney, Agent, or Firm—Donald J. Singer; Bobby D. Scearce

[57] ABSTRACT

An improved high energy laser (HEL) mirror is provided wherein the internal surfaces of the molybdenum structure of the mirror defining passageways for water coolant flow are plated with a substantially continuous coating of tungsten by chemical vapor deposition (CVD) techniques described by the invention herein. The mirror is thereby made resistant to the corrosive action of the circulating coolant water on the molybdenum structure comprising the laser mirror.

4 Claims, 3 Drawing Figures

CORROSION RESISTANT LASER MIRROR HEAT EXCHANGER

RIGHTS OF THE GOVERNMENT

The invention described herein may be manufactured and used by or for the Government of the United States for all governmental purposes without the payment of any royalty.

BACKGROUND OF THE INVENTION

This invention relates generally to the field of laser devices, and more specifically to laser mirrors having a circulating water heat exchanger adjacent the mirror or as an integral component of the mirror structure to cool the mirror during laser operation.

Certain conventionally used laser mirrors, and particularly certain high energy laser (HEL) mirrors are fabricated of molybdenum and comprise thin-walled molybdenum tubing or other passageway defining a heat exchanger brazed to the mirror for the purpose of conducting water therethrough for cooling the mirror during laser operation. The cooling means may be conventionally brazed to the mirror support structure using a high strength braze. In operation of the HEL using typical mirrors constructed as just described, and using such conventional coolant as deionized water, serious corrosion problems have been encountered. Corrosion by general attack on the molybdenum in the heat exchanger by the deionized water used as coolant in conventional HEL mirror has been observed to proceed at the rate of 0.002 inch per year or more. Galvanic corrosion between the molybdenum and the braze material may accelerate the deterioration process, seriously affecting the physical integrity of the heat exchanger. Since laser mirror faceplates, and supporting structures, and the heat exchanger brazed thereto, are by design conventionally thin (approximately 0.020 inch or less) in order to exhibit good heat transfer characteristics, such mirrors may be rapidly destroyed by corrosion of the water.

Molybdenum HEL mirrors of the kind just described are frequently and conventionally used and cost many thousands of dollars. Exact cost depends on mirror size, materials, and design requirements and complexity of structural configuration. Further, by reason of the corrosion processes just described, to which the laser mirror may be subjected, its useful operational life may be unacceptably short. Despite numerous attempts to solve the problem of molybdenum mirror structural deterioration, the problem has heretofore persisted without satisfactory solution.

The invention described herein provides an improved laser mirror, such as the HEL type, having a water cooled heat exchanger comprising water conducting passageways that are tungsten coated, which provide superior resistance to the general corrosive process of the coolant water, and eliminates galvanic attack and stress corrosion cracking in the molybdenum structure of the mirror. The tungsten coating to the inside surface of the molybdenum channels may be provided by such as the chemical vapor deposition (CVD) process disclosed herein, although other coating methods may be applied, as might occur to one with skill in the field of chemical vapor deposition techniques. Therefore, other metal coatings, such as tantalum, as might be applied using a process analogous to that disclosed herein may result in a mirror having suitable corrosive resistance.

The process disclosed herein provides a laser mirror having a continuous tungsten coating on the interior surfaces of the molybdenum heat exchanger components which prevents several forms of corrosion by the coolant water on the molybdenum structure. The physical and mechanical properties of CVD tungsten or tantalum materials are similar to the properties of molybdenum, and, therefore, the coating adds structural strength to the mirror without presenting problems of thermal conductivity or thermal expansion mismatch between coating and structure.

Therefore, providing a laser mirror having a protective coating on the molybdenum heat exchanger passageways greatly extends the mirror life by substantially eliminating the corrosion problem associated with using circulating water as coolant. Corrosion by general attack does not stop entirely since tungsten is corroded by water though at a much slower rate. The coating may be replenished periodically according to the methods described herein at low cost to extend mirror life indefinitely.

These and other objects of the present invention, as might occur to one with skill in the field of this invention, will become apparent as the detailed description proceeds.

SUMMARY OF THE INVENTION

In accordance with the foregoing principles and objects of the present invention an improved high energy laser (HEL) mirror is provided wherein the internal surfaces of the molybdenum structure of the mirror defining passageways for water coolant flow are plated with a substantially continuous coating of tungsten by chemical vapor deposition (CVD) techniques described by the invention herein. The mirror is thereby made resistant to the corrosive action of the circulating coolant water on the molybdenum structure comprising the laser mirror.

DESCRIPTION OF THE DRAWINGS

The invention will be more clearly understood from the following detailed description of specific embodiments thereof read in conjunction with the accompanying drawings wherein.

DETAILED DESCRIPTION

Figure 1:
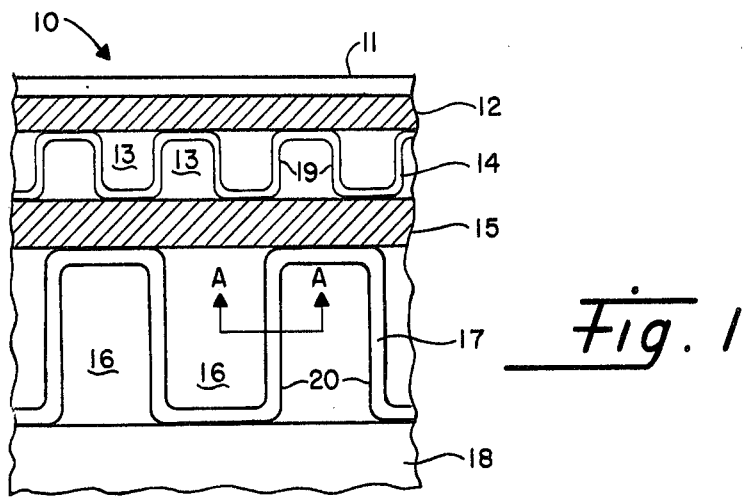
FIG. 1 is a schematic cross-section of one embodiment of a laser mirror used to demonstrate this invention.

Referring now to the accompanying drawings, FIG. 1 shows a schematic cross-section of a high energy laser mirror used in demonstration of this invention, including the molybdenum heat exchanger having passageways or channels and suitable inlets and outlets (not shown) for conducting flow of coolant water through the heat exchanger. The mirror 10 of this invention typically may comprise such as a substantially totally reflecting mirror surface 11, supported by faceplate 12 to support and preserve the contour of mirror surface 11. The mirror surface 11 may comprise a surface of dielectric enhancer, a reflector, and a binder, or other conventional mirror surfaces, deposited on the polished metallic surface of the faceplate 12. Faceplate 12 may typically be of molybdenum, tungsten, copper, graphite or any other material which meets heat transfer requirements and suitably matches the physical properties of the materials used in the design of mirror 10. Upper channels 13 defined by metallic (molybdenum) fins, corrugations, posts or ribs 14, for conducting coolant water near the faceplate 12 provide primary cooling to the mirror surface 11. Lower channels 16, defined by metallic (molybdenum) walls 17, provide for gross secondary cooling of mirror 10. The channels 13 and 16 may be of any convenient size consistent with the type, size, and thermal requirements for laser mirror 10, and may range in size from about 0.020 inch to about 0.080 inch. As discussed below, satisfactory tungsten coatings may be provided on the walls of channels 13 having size down to about 0.010 inch. Splitter plate 15 of this design of molybdenum. Backing plate 18 provides further structural support and heat sink capability to laser mirror 10, and may be of molybdenum, tungsten, or other suitable materials for the purpose thereof to be served. The various components of laser mirror 10 may be joined at their respective interfacing surfaces using a high strength braze, such as copper-gold alloy, or other suitable brazes.

Unconventional tungsten coating 19 on the walls 14 defining upper channels 13 and tungsten coating 20 on the walls 17 defining lower channels 16, may be applied using the techniques hereinafter described and provide the desired corrosion protection for the molybdenum walls 14 and 17 from action of the coolant (deionized) water which is circulated through mirror 10 during use. Tantalum coatings applied by techniques similar to that described herein for tungsten may also be applied with satisfactory results. As discussed above, the size of upper channels 13 and lower channels 16 are sufficiently small as to preclude coating the interior wall surfaces with a protective coating using conventional techniques. Flawless, uniform coatings 19 and 20 of tungsten on surfaces of walls 14 and 17, respectively, were successfully applied to sufficient and desirable thicknesses of about 0.0015 inch (0.0381 mm), without clogging the passageways represented in FIG. 1 by upper channels 13 and lower channels 16.

Figure 2:
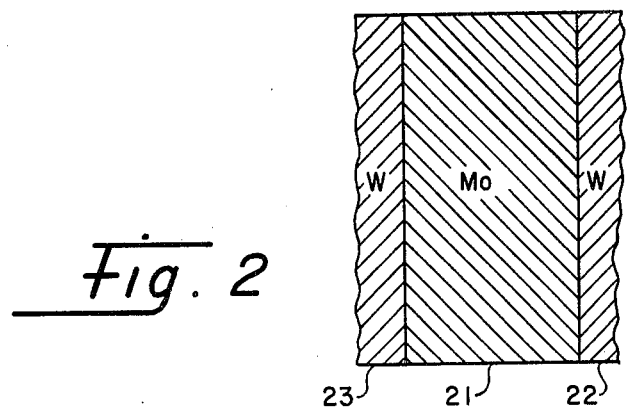
FIG. 2 is a schematic cross-section of a portion of the coated molybdenum wall of the mirror of FIG. 1 taken along section A—A showing the relative thickness and uniformity of the tungsten coating on the molybdenum structure of the mirror.

Scanning electron microscope (SEM) examination of samples of coated heat exchangers of this invention revealed no pores or voids and no discontinuities in the coatings. FIG. 2 is a schematic reproduction of a micrograph of a typical section of a passageway of an HEL mirror such as taken along section A—A of FIG. 1, showing the high quality and continuity characteristic of the tungsten coating of the laser mirror 10 of this invention. As shown in FIG. 2, a portion of a molybdenum wall 21 separating two channels for flow of coolant has applied on each side thereof tungsten coating 22 and 23 of superior uniformity.

Figure 3:
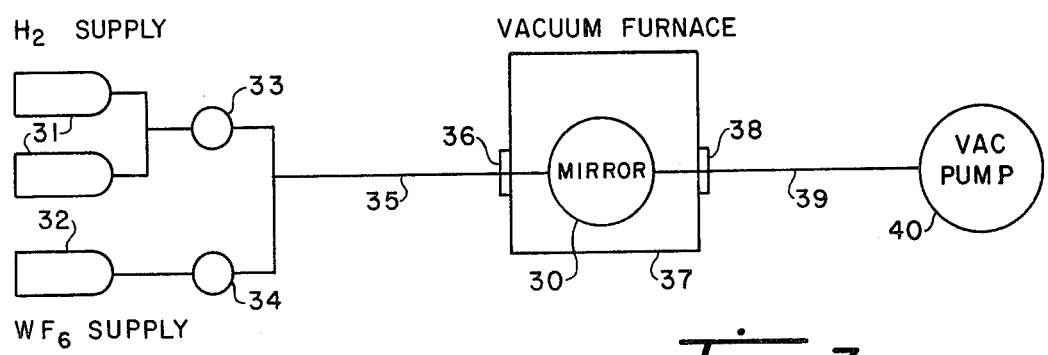
FIG. 3 is a schematic of a system used for applying a tungsten coating to the interior surfaces of the heat exchanger of an improved laser mirror herein.

Apparatus which may be used successfully to apply the desired coatings to the interior walls of the heat exchanger of such as laser mirror 10 is shown schematically in FIG. 3. The apparatus comprises hydrogen ($H_2$) supply 31 and tungsten hexafluoride ($WF_6$) supply 32. The flow of hydrogen may be controlled by such as regulator or metering valve 33, and, similarly, the flow of $WF_6$ may be controlled by regulator or metering valve 34. The $H_2$ and $WF_6$ are mixed within inlet line 35 and directed through the heat exchanger of laser mirror 30 through inlet port 36 of vacuum furnace 37; the gaseous products are exhausted from the heat exchanger or mirror 10 through outlet port 38 of furnace 37 and exhaust line 39 by the action of vacuum pump 40.

A successful procedure for providing the desired tungsten coating may be summarized as follows: a previously cleaned mirror such as that shown partially in FIG. 1, including the heat exchanger portion thereof, may be prepared for coating using the following procedure and the apparatus of FIG. 3:

a. place the mirror 30 in vacuum furnace 37 and connect the inlet and outlet ports of the heat exchanger of mirror 30 to the feed-through connections in the walls of furnace 37 represented by inlet port 36 and outlet port 38;

b. evacuate vacuum furnace to about $10^{-4}$ torr;

c. fill vacuum furnace 37 to about 220 torr with inert gas;

d. heat mirror 30 to about 510° C.;

e. flow hydrogen gas through heat exchanger at about 2000 cc/min for about 20 minutes.

The foregoing procedure, it was found, sufficiently conditions the molybdenum surfaces to successfully accept the tungsten coating. The desired coating of tungsten of about 1.5 mils may then be applied to the interior surfaces of the heat exchanger as follows:

f. maintain the temperature of the mirror 30 within vacuum furnace 37 at about 510° C.;

g. flow tungsten hexafluoride ($WF_6$) at seven gram/minute and hydrogen gas at 4000 cc/minute for about 5 minutes;

h. shut off flow of $WF_6$;

i. maintain flow of hydrogen only for several minutes;

j. reduce the temperature of the vacuum furnace 37 at the rate of about 40° C./min until the mirror 30 is cool.

Various coating thicknesses may be obtained by varying the plating time, gas mixture and plating temperature. However, it should be noted that a temperature of as much as 600° C. results in plating out of the tungsten too near the inlet of the heat exchanger without sufficient plating further downstream in the heat exchanger passageways. Similarly, a lower temperature (at about 500° C.) combined with a lower flow rate may result in excessive and premature plating at the inlet of the heat exchanger. Therefore a balance in flow rate, gas mixture, and plating time must be maintained to obtain the desired result. A flow rate of the $WF_6$, far in excess (5 to 10 times) of the rate needed to provide plating out of the tungsten must be maintained, to ensure sufficient available $WF_6$ to plate out downstream in the heat exchanger passageways, and to flush reaction products of the plating process which contaminate and inhibit the plating process downstream. To further ensure uniform plating throughout the heat exchanger passageways, a supply of hydrogen of from about 5 to 10 times the stoichiometric requirement for the $WF_6 + 3H_2 \rightarrow W + 6HF$ reaction was required, depending on the diameter, length, and circuitry of the passageways to be coated.

For a mirror the heat exchanger of which has already been exposed to water, it may be necessary to remove corrosion products and other surface contamination from the inside surfaces of the passageways to be coated with tungsten. The following cleaning process was shown to be successful:

a. flush channels with a mild cleanser; Oakite 91A, a commercial product of the Oakite Company, at about pH 11 and 85° C. proved acceptable;
b. rinse with low pressure water;
c. flush channels with 10% solution of sulfuric acid;
d. rinse again with low pressure water;
e. flush with acetone;
f. flush with isopropal alcohol and vacuum dry;
g. bake out at 50° C. in soft vacuum.

There is, therefore, described herein an improved laser mirror comprising a heat exchanger for conducting coolant water therethrough and having an internal coating of tungsten to prevent corrosion of the water on the molybdenum of which the heat exchanger components are constructed and with which the water may come into contact. It is understood that certain modifications to the invention as hereinabove described may be made, as might occur to one with skill in the field of this invention, within the scope of the appended claims. Therefore, all embodiments contemplated hereunder have not been shown in complete detail. Other embodiments may be developed without departing from the spirit of this invention or from the scope of the appended claims.

We claim:
1. An improved laser mirror comprising:
   a. a mirrored surface;
   b. a faceplate supporting said mirrored surface;
   c. a heat exchanger, adjacent said faceplate, having internal wall surfaces defining a plurality of passageways for passage therethrough of fluid coolant for cooling said faceplate;
   d. means for protecting said wall surfaces from the corrosive effect of said coolant, said means including a thin, substantially uniform metallic coating deposited on said wall surfaces.
2. The improved laser mirror as recited in claim 1 wherein said heat exchanger comprises molybdenum and said metallic coating comprises a metal selected from the group consisting of tungsten and tantalum.
3. The improved laser mirror as recited in claim 1 wherein said passageways are from about 0.010 inch to about 0.080 inch in diameter.
4. The improved laser mirror as recited in claim 1, claim 2 or claim 3 wherein said metallic coating comprises tungsten deposited by reacting tungsten hexafluoride with hydrogen in the presence of said wall surfaces at about 510° C.

* * * * *